(12) United States Patent
Lin

(10) Patent No.: US 11,706,757 B2
(45) Date of Patent: Jul. 18, 2023

(54) DATA TRANSMISSION METHOD AND TERMINAL DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/884,621

(22) Filed: May 27, 2020

(65) Prior Publication Data

US 2020/0288490 A1 Sep. 10, 2020

Related U.S. Application Data

(63) Continuation of application No. PCT/CN2017/114875, filed on Dec. 6, 2017.

(51) Int. Cl.
*H04W 72/00* (2023.01)
*H04W 72/1268* (2023.01)
*H04W 76/27* (2018.01)
*H04W 72/0446* (2023.01)
*H04W 72/21* (2023.01)

(52) U.S. Cl.
CPC ... *H04W 72/1268* (2013.01); *H04W 72/0446* (2013.01); *H04W 72/21* (2023.01); *H04W 76/27* (2018.02)

(58) Field of Classification Search
CPC ......... H04W 72/0413; H04W 72/0446; H04W 72/1257; H04W 72/1268; H04W 72/14
See application file for complete search history.

(56) References Cited

U.S. PATENT DOCUMENTS

| 2017/0288817 A1 | 10/2017 | Cao et al. |
| 2017/0318598 A1 | 11/2017 | Islam et al. |

(Continued)

FOREIGN PATENT DOCUMENTS

| CN | 101132224 A | 2/2008 |
| CN | 101132225 A | 2/2008 |

(Continued)

OTHER PUBLICATIONS

EPO, Examination Report for European Patent Application No. 17933878.5. dated Feb. 22, 2021. 8 pages.

(Continued)

*Primary Examiner* — Bo Hui A Zhu
(74) *Attorney, Agent, or Firm* — Perkins Coie LLP

(57) ABSTRACT

The present application provides a method for transmitting data and a terminal device. The method includes: a terminal device receiving first signaling, wherein the first signaling indicates the terminal device to transmit a first physical uplink channel on a first resource; the terminal device determining whether a transmission parameter used for transmitting the first physical uplink channel satisfies a preset condition; and the terminal device carrying data of a first type on the first physical uplink channel and performing transmission when the transmission parameter satisfies the preset condition, wherein the data of the first type of data is data based on grant-free transmission.

18 Claims, 4 Drawing Sheets

(56) References Cited

U.S. PATENT DOCUMENTS

| | | | | |
|---|---|---|---|---|
| 2018/0324676 | A1* | 11/2018 | Huang | H04W 76/27 |
| 2019/0149274 | A1* | 5/2019 | Freda | H04L 5/0055 |
| | | | | 370/329 |
| 2019/0387418 | A1* | 12/2019 | Yerramalli | H04B 7/0617 |
| 2020/0128529 | A1* | 4/2020 | Wang | H04L 1/0016 |

FOREIGN PATENT DOCUMENTS

| | | |
|---|---|---|
| CN | 101175301 A | 5/2008 |
| CN | 101499890 A | 8/2009 |
| CN | 102892145 A | 1/2013 |
| CN | 106507497 A | 3/2017 |
| GB | 2565772 A | 2/2019 |
| WO | 2017186160 A1 | 11/2017 |
| WO | 2018143637 A1 | 8/2018 |
| WO | 2018173515 A1 | 9/2018 |

OTHER PUBLICATIONS

3 GPP TSG RAN WG1 Meeting #91—R1-1721510—NTT Docomo, Inc., Offline summary for AI 7.3.3.4 UL data transmission procedure (41 pages).
3 GPP TSG RAN WG1 Meeting #91—Reno, USA, Nov. 27-Dec. 1, 2017—R1-1721415—NTT Docomo, Inc., Offline summary for AI 7.3.3.4 UL data transmission procedure (25 pages).
3GPP TSG RAN WG1 Meeting #90—Prague, P.R. Czechia Aug. 21-25, 2017—R1-1713716—MediaTek Inc., On support of Grant-free and Grant-based transmission for UL URLLC (4 pages).
3GPP TSG RAN WG1 Meeting #90bis—Prague, CZ, Oct. 9-13, 2017—R1-1718003—ETRI, Some considerations on UL grant-free transmission (5 pages).
3GPP TSG RAN WG1 Meeting 91—Reno, USA, Nov. 27-Dec. 1, 2017—R1-1719796—vivo, On UL data transmission procedure (12 pages).
3GPP TSG-RAN WG2 Meeting #99bis—Prague, Czech Republic, Oct. 9-13, 2017—R2-1710960 (Resubmission of R2-1708488)—vivo, Collision between grant-based and grant-free resources on the same UL carrier (3 pages).
Supplemental European Search Report dated Aug. 28, 2020 of European Patent Application No. 17933878.5 (9 pages).
CIPO, Examination Report for Canadian Patent Application No. 3084615. dated Jun. 23, 2021. 4 pages.
CNIPA, First Office Action for Chinese Patent Application No. 202010810127.5. dated Sep. 1, 2021. 17 pages with English translation.
EPO, Examination Report for European Patent Application No. 17933878.5. dated Jul. 8, 2021. 5 pages.
IPI, Examination Report for Indian Patent Application No. 202017022546. dated Jul. 14, 2021. 6 pages with English translation.
Notice of Reasons for Refusal for Japanese Patent Application No. 2020-529435 dated Nov. 30, 2021. 13 pages with English translation.
Vivo "UL data transmission procedure" R1-1717500; 3GPP TSG RAN WG1 Meeting 90bis; Prague, CZ, Oct. 9-13, 2017. 14 pages.
International Search Report dated Aug. 16, 2018 of PCT/CN2017/114875 (4 pages).
Notice of Reasons for Refusal for Japanese Application No. 2020-529435 dated Apr. 1, 2022. 6 pages with English translation.
Decision of Refusal for Japanese Application No. 2020-529435 dated Aug. 9, 2022. 5 pages with English translation.
Request for the Submission of an Opinion for Korean Application No. 2020-7016354 dated Aug. 29, 2022. 9 pages with English translation.

* cited by examiner

DATA TRANSMISSION METHOD AND TERMINAL DEVICE

CROSS-REFERENCE TO RELATED APPLICATION

This application is a continuation application of International Application No. PCT/CN2017/114875 filed on Dec. 6, 2017, the entire content of which is hereby incorporated by reference.

TECHNICAL FIELD

Embodiments of the present application relate to a field of wireless communication, and more particularly relate to a method for transmitting data and a terminal device.

BACKGROUND

In a 5G system, both grant-based uplink transmission and grant-free uplink transmission are supported. For the grant-based uplink transmission, a base station may send Uplink Grant (UL Grant) to a terminal device to schedule transmission of a physical uplink channel; for the grant-free uplink transmission, a terminal device may directly perform uplink transmission by using a pre-configured resource without waiting for scheduling by a base station.

When a terminal device supports the grant-based uplink transmission and the grant-free uplink transmission, if UL Grant is received on a same time domain resource, and there is a resource for the grant-free transmission, the terminal device may not effectively transmit data.

SUMMARY

Embodiments of the present application provide a method for transmitting data and a terminal device.

In a first aspect, a method for transmitting data is provided. The method includes: receiving, by a terminal device, a first signaling, wherein the first signaling indicates the terminal device to transmit a first physical uplink channel on a first resource; determining, by the terminal device, whether a transmission parameter used for transmitting the first physical uplink channel satisfies a preset condition; carrying, by the terminal device, data of a first type on the first physical uplink channel for transmission when the transmission parameter satisfies the preset condition, and the data of the first type is data based on grant-free transmission.

In a second aspect, a terminal device is provided. The terminal device may perform operations of the terminal device in the first aspect or any optional implementation of the first aspect. Specifically, the terminal device may include modules used for performing operations of the terminal device in the first aspect or any possible implementation of the first aspect.

In a third aspect, a terminal device is provided. The terminal device includes: a processor, a transceiver, and a memory. Wherein, the processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the first aspect or any possible implementation of the first aspect, or the execution causes the terminal device to implement the terminal device provided in the second aspect.

In a fourth aspect, a computer readable storage medium is provided. The computer readable storage medium stores a program that causes a terminal device to perform any one method for transmitting data in the above first aspect and various implementations thereof.

In a fifth aspect, a system chip is provided. The system chip includes an input interface, an output interface, a processor, and a memory, wherein the processor is used for executing instructions stored in the memory, and when the instructions are executed, the processor may implement any one method in the first aspect and various implementations thereof.

In a sixth aspect, a computer program product containing instructions is provided, when the instructions are run on a computer, the computer is caused to perform any one method of the first aspect or optional implementations of the first aspect.

DETAILED DESCRIPTION

Hereinafter, technical solutions in embodiments of the present application will be described with reference to accompanying drawings.

It should be understood that the technical solutions of the embodiments of the present application may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD), a Universal Mobile Telecommunication System (UMTS), and a future 5G communication system.

Various embodiments are described herein in connection with terminal devices in the present application. A terminal device may also refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handhold device with a wireless communication function, a computing device or other processing device connected to a wireless modem, an on-board device, a wearable device, a terminal device in a future 5G network, or a terminal device in a Future Evolved Public Land Mobile Network (PLMN), etc.

Various embodiments are described herein in connection with network devices in the present application. A network device may be a device for communicating with a terminal device, such as a Base Transceiver Station (BTS) in a GSM system or CDMA, a NodeB (NB) in a WCDMA system, or an Evolutional Node B (eNB or eNodeB) in an LTE system, or the network device may be a relay station, an access point, a vehicle-mounted device, a wearable device, a network side device in a future 5G network, or a network side device in a future evolved PLMN network, etc.

Figure 1:
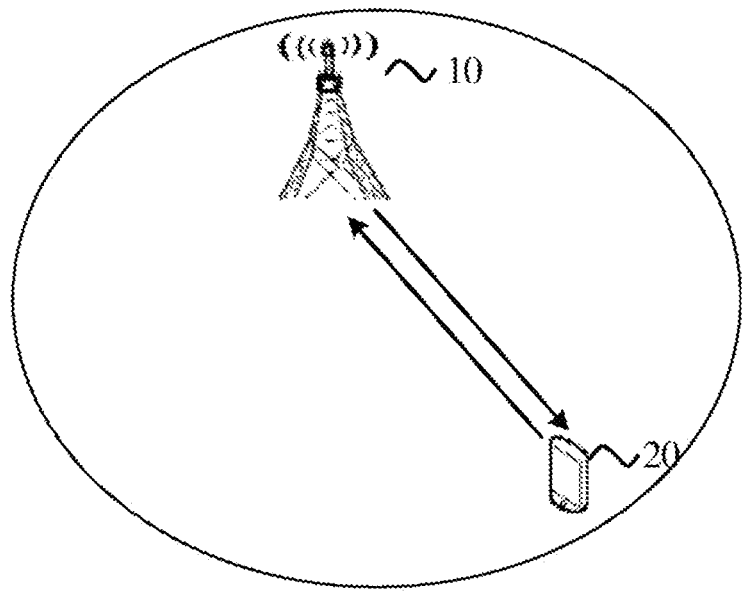
FIG. 1 is a schematic diagram of architecture of an application scenario according to an embodiment of the present application.

FIG. 1 is a schematic diagram of an application scenario of an embodiment of the present application. A communication system in FIG. 1 may include a network device 10 and a terminal device 20. The network device 10 is configured to provide a communication service for the terminal device 20 and access to a core network. The terminal device 20 may access a network by searching for a synchronization signal, or a broadcast signal, etc., transmitted by the network device 10, to communicate with the network. Arrows shown in FIG. 1 may represent uplink/downlink transmission through cellular links between the terminal device 20 and the network device 10.

A network in an embodiment of the present application may refer to a Public Land Mobile Network (PLMN) or a device-to-device (D2D) network or a machine-to-machine/man (M2M) network or other networks. FIG. 1 is a simplified schematic diagram of an example, and other terminal devices may be included in the network and are not shown in FIG. 1.

In a 5G system, many special service types, such as low latency and high reliability services (URLLC) are introduced. Characteristic of the URLLC service is to realize ultra-high reliability (e.g. 99.999%) transmission within a very short (e.g. 1 ms) delay. In order to achieve this goal, a grant-free transmission is proposed to satisfy a requirement of low delay and high reliability service transmission. Those skilled in the art may know that the grant-free transmission may also be called other names, such as unscheduled transmission, non-scheduled transmission, unauthorized transmission, etc.

In an embodiment of the present application, the data may include service data or signaling data. A transmission resource used for the grant-free transmission may include, but not limited to, one or a combination of following resources: a time domain resource, such as a radio frame, a subframe, a symbol; a frequency domain resource, such as a subcarrier, a resource block; a space domain resource, such as a transmitting antenna, a beam; a code domain resource, such as a Sparse Code Multiple Access (referred to as "SCMA") code group, a Low Density Signature (referred to as "LDS") group, a CDMA code group, an uplink pilot resource; an interleaved resource; a channel coding scheme.

The above transmission resource may be used for transmissions according to control mechanisms including, but not limited to, uplink power control, such as an upper limit control of uplink transmission power; a modulation coding scheme configuration, such as transmission block size configuration, code rate configuration, and a modulation order configuration; a retransmission mechanism, such as HARQ mechanism, etc.

The grant-free transmission adopts a pre-configured or semi-continuous resource configuration mode. When a terminal device has uplink data to transmit, a pre-configured resource may be used to directly transmit uplink data without waiting for scheduling by a base station. The grant-free transmission avoids processes of Schedule Request (SR) and Buffer Status Report (BSR) and increases effective transmission time of the terminal device.

At present, the grant-free transmission configuration may have two types, namely Type 1 and Type 2. In the Type 1, a resource used for the grant-free transmission is semi-statically configured by using a Radio Resource Control (RRC) signaling, the resource at least includes a time-frequency domain resource, reference symbol information, a modulation and coding scheme, a power control parameter, etc. In Type2, a resource used for the grant-free transmission is semi-statically configured or dynamically activated or deactivated by using a way of a combination of a RRC signaling and a physical layer signaling, and the resource configured by the RRC signaling at least include a time domain resource period and a power control parameter, etc., and the resource configured by the physical layer signaling at least include a frequency domain resource, reference symbol information and a modulation and code scheme, etc.

In addition, in a 5G system, transmission of grant-based uplink data is still supported. When the terminal device supports a transmission mode based on base station scheduling, that is, the base station transmits UL grant to the terminal device to schedule data transmission, and also supports a transmission mode based on the grant-free transmission, since the base station may not predict a transmission situation of data of the grant-free transmission, therefore, for the terminal device that supports both grant-free and grant-based transmission, on a same time domain resource, the terminal device not only receives the corresponding information of a resource scheduled through UL grant, but also has a resources that may be used for grant-free transmission, the terminal device does not know which resource to use, then the transmission of data can not effectively be performed.

In An embodiment of the present application, a resource scheduled by the network device is judged to determine whether the data to be transmitted based on the grant-free transmission is transmitted in the resource scheduled by the network device or in the resource available for the grant-free transmission. Since high reliability and efficiency is obtained by using the resource scheduled by the network device to transmit data, when the terminal device receives uplink grant information and there is data to be transmitted based on the grant-free transmission, the terminal device can use a more reliable and effective way to transmit data, thus satisfying a service transmission requirement of low delay and high reliability.

Figure 2:
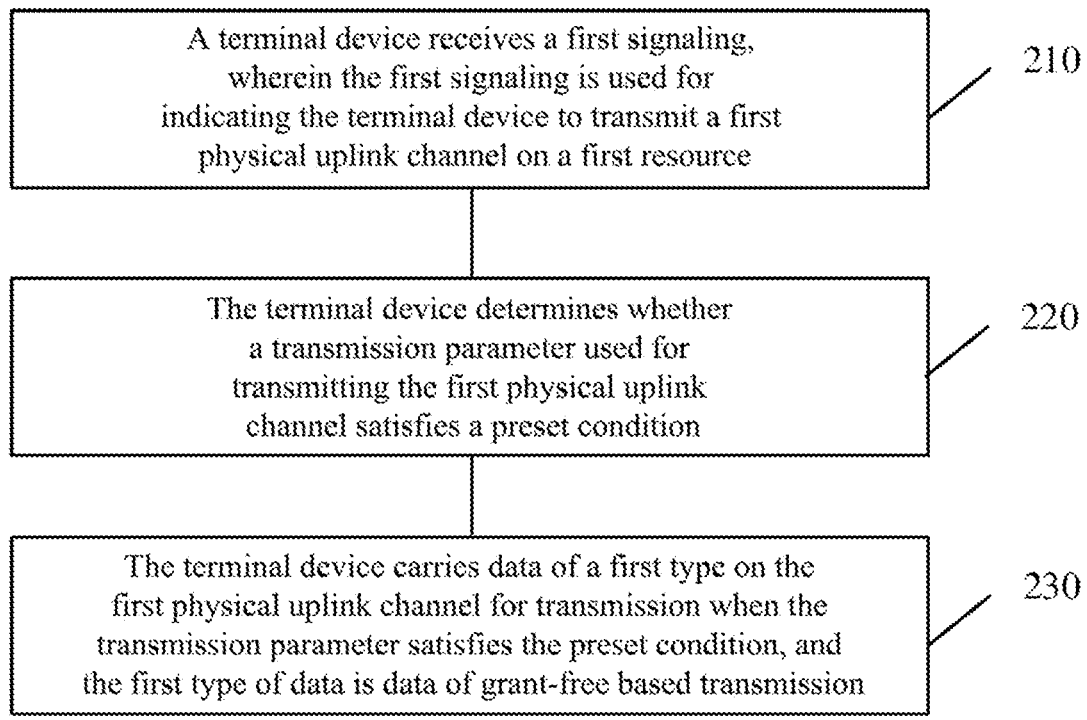
FIG. 2 is a schematic flowchart of a method for transmitting data according to an embodiment of the present application.

FIG. 2 is a schematic flowchart of a method for transmitting data according to an embodiment of the present application. The method shown in FIG. 2 may be performed by a terminal device, which may be, for example, the terminal device 20 shown in FIG. 1. As shown in FIG. 2, the method for transmitting data includes acts 210-220.

In act 210, the terminal device receives a first signaling, wherein the first signaling is used for indicating the terminal device to transmit a first physical uplink channel on a first resource.

Optionally, the first resource is a resource for transmitting data of a second type, the data of the second type is data of grant-based transmission.

For example, the first signaling may be uplink grant information sent by a network device to the terminal device to schedule the terminal device to send data by using a resource indicated by the uplink grant information. The resource indicated by the uplink grant information may include, for example, a time-frequency domain resource, reference symbol information, a modulation and coding scheme, a power control parameter, and other resource information.

In act 220, the terminal device determines whether the transmission parameter for transmitting the first physical uplink channel satisfies a preset condition.

Optionally, the transmission parameter of the first physical uplink channel includes at least one of following: a number of bits of data carried on the first physical uplink channel, a transmission block size (TBS) of data carried on the first physical uplink channel, a position of a starting time domain symbol of the first resource, a position of an ending time domain symbol of the first resource, a time domain length occupied by the first physical uplink channel, and whether the data of the second type carried on the first physical uplink channel is data transmitted for a first time.

Here, the number of bits of data carried on the first physical uplink channel refers to a number of bits of data originally expected to be scheduled by the network device, that is, a number of bits of data carried on the first physical uplink channel indicated by the first signaling; the TBS of data carried on the first physical uplink channel refers to a TBS of data originally expected to be scheduled by network device, that is, a TBS of data carried on the first physical uplink channel indicated by the first signaling; whether the data of the second type carried on the first physical uplink channel is the data transmitted for the first time refers that whether the data of the second type originally expected to be scheduled by the network device is the data transmitted for the first time.

After act 220, the terminal device may execute acts 230 or 240. If the transmission parameter for transmitting the first physical uplink channel satisfies the preset condition, then act 230 is executed, and if the transmission parameter does not satisfy the preset condition, then act 240 is executed.

In act 230, if the transmission parameter satisfies the preset condition, the terminal device carries the data of the first type on the first physical uplink channel for transmission.

Wherein, the data of the first type is data of grant-free transmission.

In 240, if the transmission parameter does not satisfy the preset condition, the terminal device carries the data of the first type on a second physical uplink channel, the second physical uplink channel is a physical uplink channel transmitted on a second resource.

Optionally, the second resource is a resource for transmitting the data of the first type, that is, a resource used for grant-free transmission.

Herein, the terminal device may receive a second signaling used for indicating the second resource sent by the network device to obtain the second resource; or, the second resource may be pre-configured in the terminal device, that is, agreed between the terminal device and the network device in advance.

Specifically, when the terminal device determines that the transmission parameter of the first physical uplink channel does not satisfy the preset condition, the terminal device will select the second physical uplink channel from the second resource used for transmitting the data of the first type and carry the data of the first type on the second physical uplink channel for transmission.

When the terminal device determines that the transmission parameter of the first physical uplink channel satisfies the preset condition, the terminal device may carry the data of the first type to be transmitted on the first physical uplink channel indicated by the first signaling for transmission. At this case, optionally, if the number of bits of the data carried on the first physical uplink channel is greater than or equal to the number of bits of the data of the first type, or if the TBS of the data carried on the first physical uplink channel is greater than or equal to the TBS of the data of the first type, the terminal device may simultaneously carry the data of first type and the data of the second type to be transmitted on the first physical uplink channel for transmission. The data of the second type to be transmitted may be data originally expected to be scheduled by the network device.

Optionally, in act 240, when the transmission parameter does not satisfy the preset condition, the terminal device may not transmit the first physical uplink channel.

Optionally, in act 240, when the transmission parameter does not satisfy the preset condition, if a total power used for simultaneously transmitting the first physical uplink channel and the second physical uplink channel is limited, the terminal device may not transmit the first physical uplink channel; or the terminal device reduces a power for transmitting the first physical uplink channel and transmits the first physical uplink channel by using a reduced power.

That is, when the transmission parameter of the first physical uplink channel does not satisfy the preset condition, the terminal device will use the second physical uplink channel in the second resource to transmit the data of the first type. At this case, in order to preferentially ensure normal transmission of the data of the first type, the terminal device may temporarily not transmit the first physical uplink channel, or transmit the first physical uplink channel with a lower power.

Therefore, in the embodiment of the present application, the terminal device judges the resource scheduled by the network device to determine whether the data to be transmitted of the grant-free based transmission is transmitted in the resource scheduled by the network device or in the resource available for the grant-free transmission. Since high reliability and efficiency is obtained by using the resource scheduled by the network device to transmit data, when the terminal device receives uplink grant information and there is data to be transmitted based on the grant-free transmission, the terminal device may use a more reliable and effective way to transmit data, thus satisfying a service transmission requirement of low delay and high reliability.

In an embodiment of the present application, when the terminal device determines whether the transmission parameter for transmitting the first physical uplink channel satisfies the preset condition, at least one of following preset conditions may be used:

the number of bits of data carried on the first physical uplink channel is greater than or equal to the number of bits of the data of the first type;

the TBS of data carried on the first physical uplink channel is greater than or equal to the TBS of the data of the first type;

a position relationship between a position of a starting time domain symbol of the first resource and a position of a starting time domain symbol of the second resource satisfies a first position relation;

a position relationship between a position of an ending time domain symbol of the first resource and a position of an ending time domain symbol of the second resource satisfies a second position relation;

a length relationship between a time domain length of the first physical uplink channel and a time domain length of the second physical uplink channel satisfies a first length relationship;

the data of the second type carried on the first physical uplink channel is data transmitted for a first time.

Herein, optionally, the first position relationship includes any one of following: the position of the starting time domain symbol of the first resource is same as the position of the starting time domain symbol of the second resource; the position of the starting time domain symbol of the first resource is located before the position of the starting time domain symbol of the second resource, and a time difference between the starting time domain symbol of the first resource and the starting time domain symbol of the second resource is less than or equal to a first threshold; the position of the starting time domain symbol of the first resource is located after the position of the starting time domain symbol of the second resource; the position of the starting time domain symbol of the first resource is located after the position of the starting time domain symbol of the second resource, and an absolute value of a time difference between the starting time domain symbol of the first resource and the starting time domain symbol of the second resource is less than or equal to a second threshold.

Herein, optionally, the second position relationship includes any one of following: the position of the ending time domain symbol of the first resource is same as the position of the end time domain symbol of the second resource; the position of the ending time domain symbol of the first resource is located after the position of the ending time domain symbol of the second resource, and a time difference between the ending time domain symbol of the first resource and the ending time domain symbol of the second resource is less than or equal to a third threshold; the position of the ending time domain symbol of the first resource is located before the position of the ending time domain symbol of the second resource; the position of the ending time domain symbol of the first resource is located before the position of the ending time domain symbol of the second resource, and an absolute value of a time difference between the ending time domain symbol of the first resource and the ending time domain symbol of the second resource is less than or equal to a fourth threshold.

Herein, optionally, the first length relation includes any one of following: the time domain length of the first physical uplink channel is equal to the time domain length of the second physical uplink channel; a difference between the time domain length of the first physical uplink channel and the time domain length of the second physical uplink channel is greater than or equal to a fifth threshold and less than or equal to a sixth threshold.

Optionally, before the terminal device determines whether the transmission parameter for transmitting the first physical uplink channel satisfies the preset condition, the method further includes: the terminal device receives indication information, wherein the indication information is used for indicating threshold information; or the terminal device acquires threshold information pre-stored in the terminal device. The threshold information includes at least one of following: the first threshold, the second threshold, the third threshold, the fourth threshold, the fifth threshold and the sixth threshold.

Figure 3:
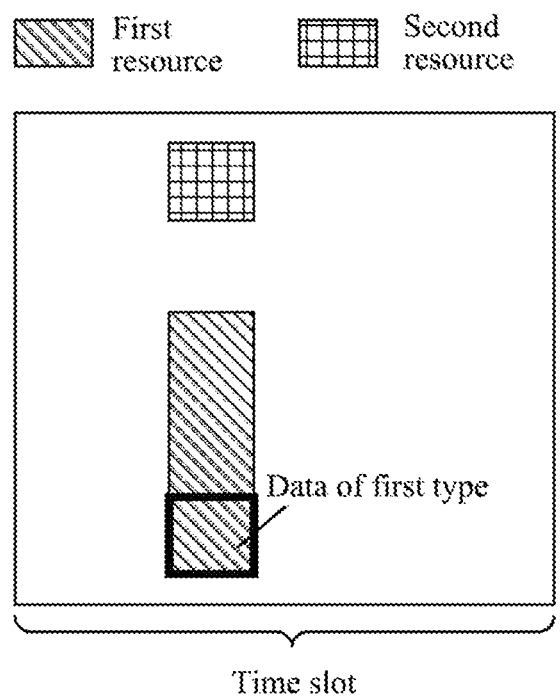
FIG. 3 is a schematic diagram of a first resource and a second resource according to an embodiment of the present application.

For example, the first resource and the second resource shown in FIG. 3, assuming that the preset condition is that the position of the starting time domain symbol of the first resource is same as the position of the starting time domain symbol of the second resource, and the position of the ending time domain symbol of the first resource is same as the position of the ending time domain symbol of the second resource. Herein the first resource is a resource where the first physical uplink channel, is located, indicated by the network device through the first signaling, and the second resource is a resource used for the grant-free transmission. It can be seen that since a time domain resource occupied by the first resource and a time domain resource occupied by the second resource are same and satisfy the preset condition, the terminal device may carry the data to be transmitted of the first type, that is, data of grant-free transmission, on the first physical uplink channel for transmission (shown in the black bold box).

Figure 4:
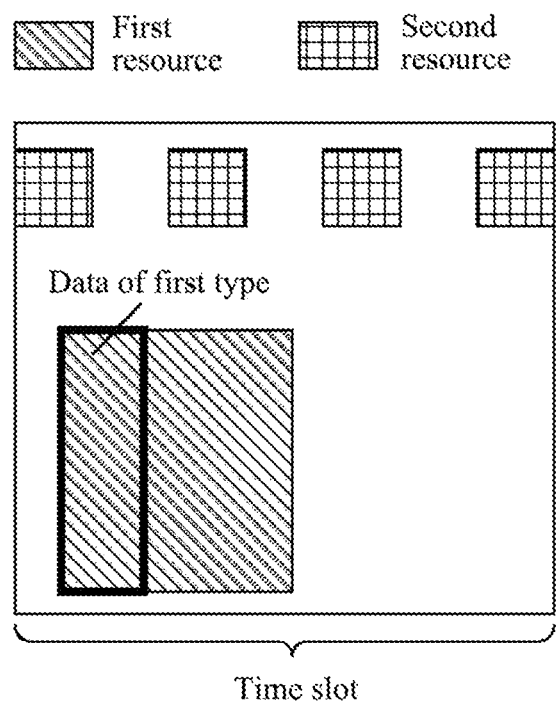
FIG. 4 is another schematic diagram of a first resource and a second resource according to an embodiment of the present application.

For another example, the first resource and the second resource shown in FIG. 4, assuming that the preset condition is that the position of the starting time domain symbol of the first resource is same as the position of the starting time domain symbol of the second resource, or the preset condition is that the position of the starting time domain symbol of the first resource is located after the position of the starting time domain symbol of the second resource, and the position of the ending time domain symbol of the first resource is located before the position of the ending time domain symbol of the second resource. Herein the first resource is a resource where the first physical uplink channel indicated by the network device through the first signaling is located, the second resource is a resource used for the grant-free transmission, and data of the grant-free transmission is repeatedly transmitted by using multiple sub-resources included in the second resource. It can be seen that since the preset condition is satisfied between the first resource and the second resource, the terminal device may carry the data of first type to be transmitted, i.e. data of the grant-free transmission, on the first physical uplink channel for transmission (shown in the black bold box).

It should be understood that in various embodiments of the present application, sequence numbers of the various processes do not imply an order of execution of the various processes, which should be determined by their functions and internal logics, and should not constitute any limitation on implementation processes of the embodiments of the present application.

The methods for transmitting data according to the embodiments of the present application have been described in detail above. Devices according to embodiments of the present invention will be described with reference to FIGS. 5 to 6. Technical features described in the method embodiments are applicable to following devices embodiments.

Figure 5:
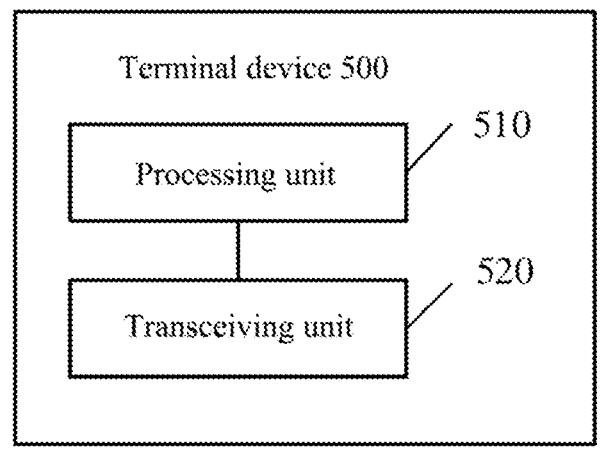
FIG. 5 is a schematic block diagram of a terminal device according to an embodiment of the present application.

FIG. 5 is a schematic block diagram of a terminal device 500 according to an embodiment of the present application. As shown in FIG. 5, the terminal device 500 includes a transceiving unit 510 and a processing unit 520. The transceiving unit 510 IS configured to receive a first signaling, wherein the first signaling is used for indicating the terminal device to transmit a first physical uplink channel on a first resource.

The processing unit 520 is configured to determine whether a transmission parameter for transmitting the first physical uplink channel satisfies a preset condition.

The transceiving unit 510 is further configured to carry the data of the first type on the first physical uplink channel for transmission when the transmission parameter satisfies the preset condition, wherein the data of the first type is data of grant-free based transmission.

Therefore, the terminal device judges the resource scheduled by the network device to determine whether the data of the grant-free transmission to be transmitted is transmitted in the resource scheduled by the network device or in a resource available for the grant-free transmission. Since high reliability and efficiency is obtained by using the resource scheduled by the network device to transmit data, when the terminal device receives uplink grant information and there is data to be transmitted of grant-free transmission, the terminal device can use a more reliable and effective way to transmit data, thus satisfying a service transmission requirement of low delay and high reliability.

Optionally, the first resource is a resource for transmitting data of a second type, and the second type of data is data of grant-based transmission.

Optionally, the transmission parameter of the first physical uplink channel include at least one of following: a number of bits of data carried on the first physical uplink channel, a transmission block size (TBS) of data carried on the first physical uplink channel, a position of a starting time domain symbol of the first resource, a position of an ending time domain symbol of the first resource, a time domain length occupied by the first physical uplink channel, and whether the data of the second type carried on the first physical uplink channel is data to be transmitted for a first time.

Optionally, the transceiving unit 510 is further configured to carry the data of the first type on a second physical uplink channel for transmission when the transmission parameter does not satisfy the preset condition, and the second physical uplink channel is a physical uplink channel transmitted on a second resource.

Optionally, the transceiving unit 510 is further configured to not transmit the first physical uplink channel.

Optionally, if a total power used for simultaneously transmitting the first physical uplink channel and the second physical uplink channel is limited, the transceiving unit 510 is further configured to not transmit the first physical uplink channel; or reduce a power for transmitting the first physical uplink channel and transmitting the first physical uplink channel by using a reduced power.

Optionally, the transceiving unit 510 is further configured to receive a second signaling, and the second signaling is used for indicating the second resource.

Optionally, the preset condition includes at least one of following: the number of bits of the data carried on the first physical uplink channel is greater than or equal to the number of bits of the data of the first type; the TBS of the data carried on the first physical uplink channel is greater than or equal to the TBS of the data of the first type; a position relationship between the position of the starting time domain symbol of the first resource and the position of the starting time domain symbol of the second resource satisfies a first position relationship; a position relationship between the position of the ending time domain symbol of the first resource and the position of the ending time domain symbol of the second resource satisfies a second position relationship; a length relationship between the time domain length of the first physical uplink channel and the time domain length of the second physical uplink channel satisfies a first length relation; the data of the second type carried on the first physical uplink channel is data transmitted for a first time.

Optionally, the first position relationship includes any one of following: the position of the starting time domain symbol of the first resource is same as the position of the starting time domain symbol of the second resource; the position of the starting time domain symbol of the first resource is located before the position of the starting time domain symbol of the second resource, and a time difference between the starting time domain symbol of the first resource and the starting time domain symbol of the second resource is less than or equal to a first threshold; the position of the starting time domain symbol of the first resource is located after the position of the starting time domain symbol of the second resource; the position of the starting time domain symbol of the first resource is located after the position of the starting time domain symbol of the second resource, and an absolute value of a time difference between the starting time domain symbol of the first resource and the starting time domain symbol of the second resource is less than or equal to a second threshold.

Optionally, the second position relationship includes any one of following: the position of the ending time domain symbol of the first resource is same as the position of the ending time domain symbol of the second resource; the position of the ending time domain symbol of the first resource is located after the position of the ending time domain symbol of the second resource, and a time difference between the ending time domain symbol of the first resource and the ending time domain symbol of the second resource is less than or equal to a third threshold; the position of the ending time domain symbol of the first resource is located before the position of the ending time domain symbol of the second resource; the position of the ending time domain symbol of the first resource is located before the position of the ending time domain symbol of the second resource, and an absolute value of a time difference between the ending time domain symbol of the first resource and the ending time domain symbol of the second resource is less than or equal to a fourth threshold.

Optionally, the first length relationship includes any one of following: the time domain length of the first physical uplink channel is equal to the time domain length of the second physical uplink channel; a difference between the time domain length of the first physical uplink channel and the time domain length of the second physical uplink channel is greater than or equal to a fifth threshold and less than or equal to a sixth threshold.

Optionally, the processing unit 520 is further configured to receive indication information through the transceiving unit 510, and the indication information is used for indicating threshold information; or acquire threshold information pre-stored in the terminal device. The threshold information includes at least one of following: the first threshold, the second threshold, the third threshold, the fourth threshold, the fifth threshold and the sixth threshold.

Optionally, when the number of bits of the data carried on the first physical uplink channel is greater than or equal to the number of bits of the data of the first type, or when the TBS of the data carried on the first physical uplink channel is greater than or equal to the TBS of the data of the first type, the transceiver unit 510 is specifically configured to simultaneously carry the data of the first type and the data of the second type on the first physical uplink channel for transmission.

It should be understood that the terminal device 500 may perform the corresponding operations of the method 200 performed by the terminal device in the above method embodiment, and will not be described in detail here for the sake of brevity.

Figure 6:
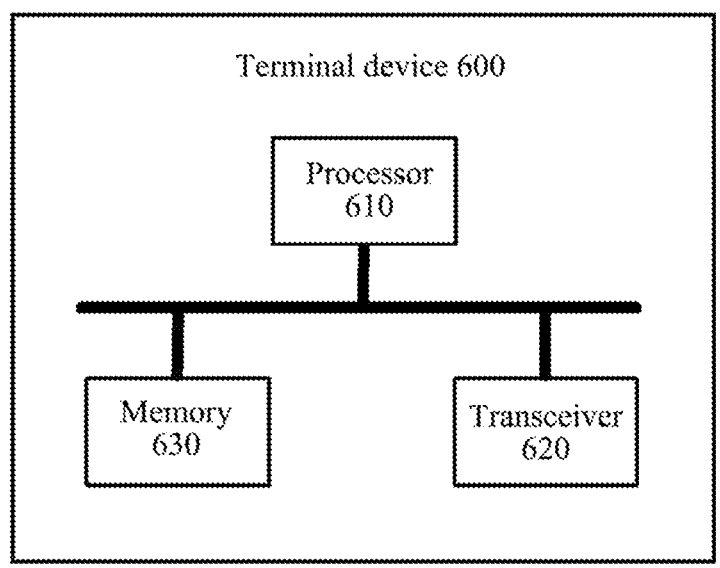
FIG. 6 is a schematic diagram of structure of a terminal device according to an embodiment of the present application.

FIG. 6 is a schematic diagram of structure of a terminal device 600 according to an embodiment of the present application. As shown in FIG. 6, the terminal device includes a processor 610, a transceiver 620, and a memory 630, wherein the processor 610, the transceiver 620, and the memory 630 communicate with each other through an internal connection path. The memory 630 is configured to store instructions, and the processor 610 is configured to execute the instructions stored in the memory 630 to control the transceiver 620 to send or receive signals.

Optionally, the processor 610 may call a program code stored in the memory 630 to perform corresponding operations of the terminal device in the method embodiments, which will not be described here repeatedly for brevity.

It should be understood that the processor in an embodiment of the present application may be an integrated circuit chip with a capability for processing signals. In the implementation process, the actions of the method embodiments described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in embodiments of the present application. The general purpose processor may be a microprocessor, or the processor may be any conventional processor or the like. The actions of the method disclosed in connection with the embodiments of the present application may be directly embodied by the execution of the hardware decoding processor, or by the execution of a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the actions of the above method in combination with its hardware.

It should be understood that the memory in embodiments of the present application may be a transitory memory or a non-transitory memory, or may include both transitory and non-transitory memories. The non-transitory memory may be a read-only memory (ROM), programmable ROM (PROM), an erasable programmable ROM (EPROM), electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but not limited to, these and any other suitable types of memories.

Figure 7:
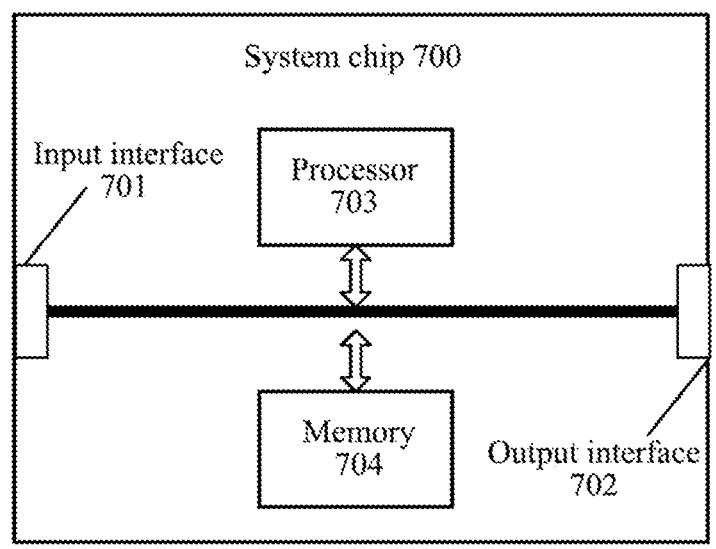
FIG. 7 is a schematic diagram of structure of a system chip according to an embodiment of the present application.

FIG. 7 is a schematic diagram of structure of a system chip according to an embodiment of the present application. The system chip 700 of FIG. 7 includes an input interface 701, an output interface 702, at least one processor 703, and a memory 704. The input interface 701, the output interface 702, the processor 703, and the memory 704 are connected to each other through an internal connection path. The processor 703 is configured to execute codes in the memory 704.

Optionally, the processor 703 may implement the method 200 executed by the terminal device in the method embodiment when the codes are executed. For the sake of brevity, it will not be repeated here.

It should be understood that in an embodiment of the present invention, "B corresponding to A" means that B is associated with A, and B may be determined according to A. However, it should be further understood that determining B according to A does not mean B is determined according to A only, but B may be determined according to A and/or other information.

It should also be understood that the term "and/or" in this document is merely an association relationship describing associated objects, indicating that there may be three relationships, for example, A and/or B may indicate three situations: A alone, A and B, and B alone. In addition, the symbol "/" in this document generally indicates that objects before and after the symbol "/" have an "or" relationship.

Those of ordinary skill in the art will recognize that the exemplary elements and algorithm acts described in combination with the embodiments disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the method embodiments and will not be described here.

In several embodiments provided by the present application, it should be understood that the disclosed systems, apparatuses and methods may be implemented in other ways. For example, the apparatus embodiment described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the embodiments.

In addition, various functional units in various embodiments of the present application may be integrated in one monitoring unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various embodiments of the present application. The aforementioned storage medium includes various media capable of storing program codes, such as a U disk, a mobile hard disk, a read-only memory (ROM), a random access memory (RAM), a magnetic disk, or an optical disk.

What are described above are merely exemplary embodiments of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claim is:

1. A method for transmitting data, comprising:
   receiving, by a terminal device, a first signaling, wherein the first signaling is used for indicating the terminal device to transmit a first physical uplink channel on a first resource, wherein the first resource is a resource for transmitting grant-based transmission;
   determining, by the terminal device, whether a transmission parameter used for transmitting the first physical uplink channel satisfies a preset condition; and
   carrying, by the terminal device, data of a first type on the first physical uplink channel for transmission when the transmission parameter satisfies the preset condition, wherein the data of the first type is data of grant-free based transmission,
   wherein resource configured for transmitting the data of the first type is indicated by a second signaling, and the second signaling is different from the first signaling,
   wherein the transmission parameter of the first physical uplink channel comprises a transmission block size (TBS) of data carried on the first physical uplink channel,
   wherein the preset condition comprises: the TBS of data carried on the first physical uplink channel being equal to a TBS of the data of grant-free based transmission.

2. The method of claim 1, further comprising:
   carrying, by the terminal device, the data of the first type on a second physical uplink channel for transmission when the transmission parameter does not satisfy the preset condition, wherein the second physical uplink channel is a physical uplink channel transmitted on a second resource.

3. The method of claim 1, wherein, when a number of bits of data carried on the first physical uplink channel is greater than or equal to a number of bits of the data of the first type, or when the TBS of data carried on the first physical uplink channel is greater than or equal to the TBS of the data of the first type, carrying, by the terminal device, the data of the first type on the first physical uplink channel for transmission comprises:
   carrying, by the terminal device, the data of the first type and data of a second type simultaneously on the first physical uplink channel for transmission.

4. The method of claim 1, wherein the grant-free based transmission comprises Type 1 transmission or Type 2 Transmission;
   wherein the Type 1 transmission is configured by an RRC signaling; or
   the Type 2 transmission is configured by an RRC signaling and activated by a physical signaling.

5. The method of claim 1, wherein the first resource is a resource for transmitting data of a second type, the data of the second type is data of the grant-based transmission.

6. The method of claim 5, wherein the preset condition comprises: a TBS of the data of the grant-based transmission being equal to the TBS of the data of the grant-free based transmission.

7. A terminal device, comprising:
   a transceiver, configured to receive a signaling, wherein the signaling is used for indicating the terminal device to transmit a first physical uplink channel on a first resource, wherein the first resource is a resource for transmitting grant-based transmission;
   a processor, configured to determine whether a transmission parameter used for transmitting the first physical uplink channel satisfies a preset condition; and
   the transceiver is further configured to carry data of a first type on the first physical uplink channel for transmission when the transmission parameter satisfies the preset condition, wherein the data of the first type is data of grant-free based transmission,
   wherein resource configured for transmitting the data of the first type is indicated by a second signaling, and the second signaling is different from the first signaling,
   wherein the transmission parameter of the first physical uplink channel comprises
   a transmission block size (TBS) of data carried on the first physical uplink channel,
   wherein the preset condition comprises: the TBS of data carried on the first physical uplink channel being equal to a TBS of the data of grant-free based transmission.

8. The terminal device of claim 7, wherein the transceiver is further configured to:
   carry the data of the first type on a second physical uplink channel for transmission when the transmission parameter does not satisfy the preset condition, wherein the second physical uplink channel is a physical uplink channel transmitted on a second resource.

9. The terminal device of claim 7, wherein when a number of bits of data carried on the first physical uplink channel is greater than or equal to a number of bits of the data of the first type, or the TBS of data carried on the first physical uplink channel is greater than or equal to the TBS of the data of the first type, the transceiver is specifically configured to:
   carry the data of the first type and data of a second type simultaneously on the first physical uplink channel for transmission.

10. The terminal device of claim 7, wherein the grant-free based transmission comprises Type 1 transmission or Type 2 Transmission;
    wherein the Type 1 transmission is configured by an RRC signaling; or
    the Type 2 transmission is configured by an RRC signaling and activated by a physical signaling.

11. The terminal device of claim 7, wherein the first resource is a resource for transmitting data of a second type, the data of the second type is data of the grant-based transmission.

12. The terminal device of claim 11, wherein the preset condition comprises: a TBS of the data of the grant-based transmission being equal to the TBS of the data of the grant-free based transmission.

13. A network device, comprising a processor and a transceiver, wherein the processor is configured to control the transceiver to send a first signaling to a terminal device, wherein the first signaling is used for indicating the terminal device to transmit a first physical uplink channel on a first resource, wherein the first resource is a resource for transmitting grant-based transmission;

wherein the terminal device is configured to determine whether a transmission parameter used for transmitting the first physical uplink channel satisfies a preset condition; and carry data of a first type on the first physical uplink channel for transmission when the transmission parameter satisfies the preset condition, wherein the data of the first type is data of grant-free based transmission, wherein resource configured for transmitting the data of the first type is indicated by a second signaling, and the second signaling is different from the first signaling, wherein the transmission parameter of the first physical uplink channel comprises a transmission block size (TBS) of data carried on the first physical uplink channel, wherein the preset condition comprises: the TBS of data carried on the first physical uplink channel being equal to a TBS of the data of grant-free based transmission.

14. The network device of claim 13, wherein the terminal device is further configured to carry the data of the first type on a second physical uplink channel for transmission when the transmission parameter does not satisfy the preset condition, wherein the second physical uplink channel is a physical uplink channel transmitted on a second resource.

15. The network device of claim 13, wherein when a number of bits of data carried on the first physical uplink channel is greater than or equal to a number of bits of the data of the first type, or the TBS of data carried on the first physical uplink channel is greater than or equal to the TBS of the data of the first type, the terminal device is further configured to carry the data of the first type and data of a second type simultaneously on the first physical uplink channel for transmission.

16. The network device of claim 13, wherein the grant-free based transmission comprises Type 1 transmission or Type 2 Transmission;
    wherein the Type 1 transmission is configured by an RRC signaling; or
    the Type 2 transmission is configured by an RRC signaling and activated by a physical signaling.

17. The network device of claim 13, wherein the first resource is a resource for transmitting data of a second type, the data of the second type is data of the grant-based transmission.

18. The network device of claim 17, wherein the preset condition comprises: a TBS of the data of the grant-based transmission being equal to the TBS of the data of the grant-free based transmission.

* * * * *